US007493804B2

(12) United States Patent
Achleitner et al.

(10) Patent No.: US 7,493,804 B2
(45) Date of Patent: Feb. 24, 2009

(54) METHOD AND DEVICE FOR MONITORING A FUEL SUPPLYING DEVICE OF AN INTERNAL COMBUSTION ENGINE

(75) Inventors: Erwin Achleitner, Obertraubling (DE); Martin Cwielong, Regensburg (DE); Gerhard Eser, Hemau (DE)

(73) Assignee: Siemens Aktiengesellschaft, Munich (DE)

( * ) Notice: Subject to any disclaimer, the term of this patent is extended or adjusted under 35 U.S.C. 154(b) by 262 days.

(21) Appl. No.: 11/628,900

(22) PCT Filed: Mar. 29, 2005

(86) PCT No.: PCT/EP2005/051419

§ 371 (c)(1),
(2), (4) Date: Dec. 8, 2006

(87) PCT Pub. No.: WO2005/121535

PCT Pub. Date: Dec. 22, 2005

(65) Prior Publication Data

US 2008/0264155 A1 Oct. 30, 2008

(51) Int. Cl.
*G01M 15/00* (2006.01)

(52) U.S. Cl. .................................................... 73/114.41

(58) Field of Classification Search .............. 73/114.38, 73/114.41, 114.42, 114.43, 114.45
See application file for complete search history.

(56) References Cited

U.S. PATENT DOCUMENTS

| | | | | |
|---|---|---|---|---|
| 5,738,063 | A | 4/1998 | Pfuhl et al. | |
| 6,234,148 | B1 | 5/2001 | Hartke et al. | |
| 6,389,901 | B1 | 5/2002 | Joos et al. | |
| 2006/0144130 | A1* | 7/2006 | Eser et al. | 73/118.1 |
| 2007/0084274 | A1* | 4/2007 | Takayanagi | 73/118.1 |
| 2007/0193558 | A1* | 8/2007 | Achleitner et al. | 123/447 |
| 2007/0213918 | A1* | 9/2007 | Achleitner et al. | 701/101 |
| 2007/0295310 | A1* | 12/2007 | Achleitner et al. | 123/495 |

FOREIGN PATENT DOCUMENTS

| | | | |
|---|---|---|---|
| DE | 196 34 982 | C2 | 10/1998 |
| DE | 197 27 794 | C1 | 1/1999 |
| DE | 198 56 203 | A1 | 6/2000 |
| DE | 101 44 800 | A1 | 4/2003 |
| JP | 10 089135 | A | 4/1998 |
| JP | 2004027952 | A | 1/2004 |

* cited by examiner

*Primary Examiner*—Eric S McCall

(57) ABSTRACT

The invention relates to a fuel supplying device comprising a low-pressure circuit, a high-pressure pump which is coupled to the low-pressure circuit on the input side thereof and transports fuel into a fuel accumulator, and an actuator which controls the fuel flow rate of the high-pressure pump. In the event of a stationary load, a first value of a fuel pressure and a first actuating signal of the actuator are determined, a second value of the fuel pressure is set, and said second value being larger or smaller than the first value of the fuel pressure by a pre-determined amount, a second actuating signal of the actuator is determined once the second value of the fuel pressure has been set, and an error in the fuel supplying device is detected according to the first and second actuating signals of the actuator.

17 Claims, 2 Drawing Sheets

METHOD AND DEVICE FOR MONITORING A FUEL SUPPLYING DEVICE OF AN INTERNAL COMBUSTION ENGINE

CROSS REFERENCE TO RELATED APPLICATIONS

This application is the U.S. National Stage of International Application No. PCT/EP2005/051419, filed Mar. 29, 2005 and claims the benefit thereof. The International Application claims the benefits of German Patent application No. 10 2004 028 515.2 filed Jun. 11, 2004. All of the applications are incorporated by reference herein in their entirety.

FIELD OF INVENTION

The invention relates to a method and device for monitoring a fuel supplying device of an internal combustion engine with a low-pressure circuit, a high-pressure pump which is coupled to the low-pressure circuit on the input side thereof and transports fuel into a fuel accumulator, and an actuator which controls the fuel flow rate of the high-pressure pump.

BACKGROUND OF THE INVENTION

The demands made on internal combustion engines, particularly in motor vehicles, are increasing as a result of strict statutory regulations relating to the pollutant emissions and because of customer demands with regard to reliability, the efficient use of operating resources, particularly of fuel, and low maintenance requirements. Such requirements can only be met properly if malfunctions of the vehicle components are detected and recorded reliably and accurately so that malfunctions can be compensated for or repairs of the faulty vehicle components be initiated in each case. To this end, the vehicle components, particularly all the vehicle components specific to exhaust gas, such as for example a catalytic converter unit, a lambda probe and the entire fuel system are monitored. Because of the monitoring measures, it should be possible to ensure low-emission operation and it should be possible to maintain driving safety. This also includes the fact that on the occurrence of errors, an emergency mode of the internal combustion engine can be ensured and consequential damage thus be avoided. The driver of the motor vehicle is informed about the malfunction, if required, so that said driver can initiate a check and/or repair work in a workshop. The monitoring device of the internal combustion engine stores information about the errors which have occurred, such as for example the type of error, the location of the error and the operating conditions under which the malfunction occurred. This information can be evaluated in a workshop and thus supports the repair work.

SUMMARY OF INVENTION

The object of the invention is to create a method and a device for monitoring a fuel supplying device of an internal combustion engine or that the said method and device for monitoring a fuel supplying device of an internal combustion engine is reliable.

The object of the invention is achieved by the features of the independent patent claims. Advantageous further embodiments of the invention are characterized in the subclaims.

The invention relates to a method and a corresponding device for monitoring a fuel supplying device of an internal combustion engine. The fuel supplying device comprises a low-pressure circuit, a high-pressure pump which is coupled to the low-pressure circuit on the input side thereof and transports fuel into a fuel accumulator, and an actuator which controls the fuel flow rate of the high-pressure pump. If a stationary load is present, a first value of a fuel pressure and a first actuating signal of the actuator are determined, a second value of the fuel pressure is set, said second value being larger or smaller than the first value of the fuel pressure by a predetermined amount, a second actuating signal of the actuator is determined once the second value of the fuel pressure has been set, and an error in the fuel supplying device is detected depending on the first and second actuating signals of the actuator. Leakages from the high-pressure side to the low-pressure side can be detected in a simple manner by this method. No sensors or the control elements are needed in addition to those required for the operation of the internal combustion engine.

By executing the steps for monitoring a fuel supplying device for a stationary load, the fuel supplying device can be monitored both accurately and in a very simple manner. The invention applies the knowledge that in the event of a stationary load, a rotational speed, a volume of air supplied to the cylinders of the internal combustion engine and a quantity of fuel injected into the cylinders, or corresponding operating variables remain the same. Furthermore, the invention is based one the knowledge that changes in the fuel feed flow in the event of a change in the fuel pressure are characteristic of a leakage under these conditions.

If no leakage from the high-pressure side to the low-pressure side can be detected, then the second actuating signal of the actuator only deviates very slightly from the first actuating signal of the actuator or the second actuating signal of the actuator does not deviate at all from the first actuating signal of the actuator. In this case, the high-pressure pump only feeds the quantity of fuel to be injected. However, should there be a leakage in the fuel supplying device, then the quantity of fuel escaping due to the leakage is larger in the case of a high fuel pressure than in the case of a low fuel pressure. In order to be able to inject the same quantity of fuel and to maintain the fuel pressure, the high-pressure pump in the case of a high fuel pressure must transport a larger quantity of fuel than in the case of a low fuel pressure. In this case, the first and the second actuating signals of the actuator deviate in such a way from each other that the presence of the leakage can easily be detected.

In an advantageous embodiment of the method, the second actuating signal of the actuator is determined when the fuel pressure in the fuel accumulator is stationary. Therefore, it can be ensured in a simple manner that the second value of the fuel pressure has then actually been set. The flow of fuel through the specific injection valve depends on the fuel pressure. In the event of low dynamics of the fuel pressure—that is if the fuel pressure is stationary—an accurate metering of the desired quantity of fuel can be guaranteed more easily. The result is that it is also very likely that the quantity of fuel actually metered is then the same as the said quantity of fuel that was metered when the first value of the fuel pressure was recorded.

In a further advantageous embodiment of the method, the second actuating signal of the actuator is determined if a variable characterizing the air-to-fuel ratio in the cylinder is stationary and a value of the said variable is the same as the value of the variable which it had when the first value of the fuel pressure was determined. In the event of a stationary load, the volume of air supplied to the cylinders of the internal combustion engine is stationary. Changes in the injected quantity of fuel have an effect on the air-to-fuel ratio in the cylinder, which bring about corresponding changes in the variable characterizing the air-to-fuel ratio in the cylinder. Under the conditions of the stationary load, it can be ensured in a simple and accurate manner that the quantity of fuel injected into the cylinders of the internal combustion engine once the second value of the fuel pressure has been set, corresponds to the quantity of fuel, which was injected into the cylinders before the second value of the fuel pressure was set if, in essence, the variable characterizing the air-to-fuel ratio in the cylinder is essentially the same.

In a further advantageous embodiment of the method, the error is detected in the fuel supplying device if the second actuating signal of the actuator deviates at least from the first actuating signal of the actuator by a predetermined amount or a predetermined factor. This makes possible a very simple and accurate monitoring of the fuel supplying device.

In a further advantageous embodiment of the method, the first and the second actuating signals of the actuator are determined if the internal combustion engine is operated at a small load. It has been proven that at a small load, the sensitivity for detecting leakages is higher than in the case of a large load. Therefore, the monitoring of the fuel supplying device can be carried out in a particularly accurate manner.

In a further advantageous embodiment of the method, the first and the second actuating signals of the actuator are determined if the internal combustion engine is operated at idling. In the event of operating the internal combustion engine at idling, the load is mostly small and stationary. Therefore, idling is in particular very suitable for determining deviations of the second actuating signal of the actuator from the first actuating signal of the actuator and for detecting leakages in the fuel supplying device in an accurate and reliable manner.

BRIEF DESCRIPTION OF THE DRAWINGS

Exemplary embodiments of the invention are explained in detail below with reference to the accompanying drawings. The drawings show.

Elements with the same design and function are provided in all the figures with the same reference symbols.

DETAILED DESCRIPTION OF INVENTION

Figure 1:
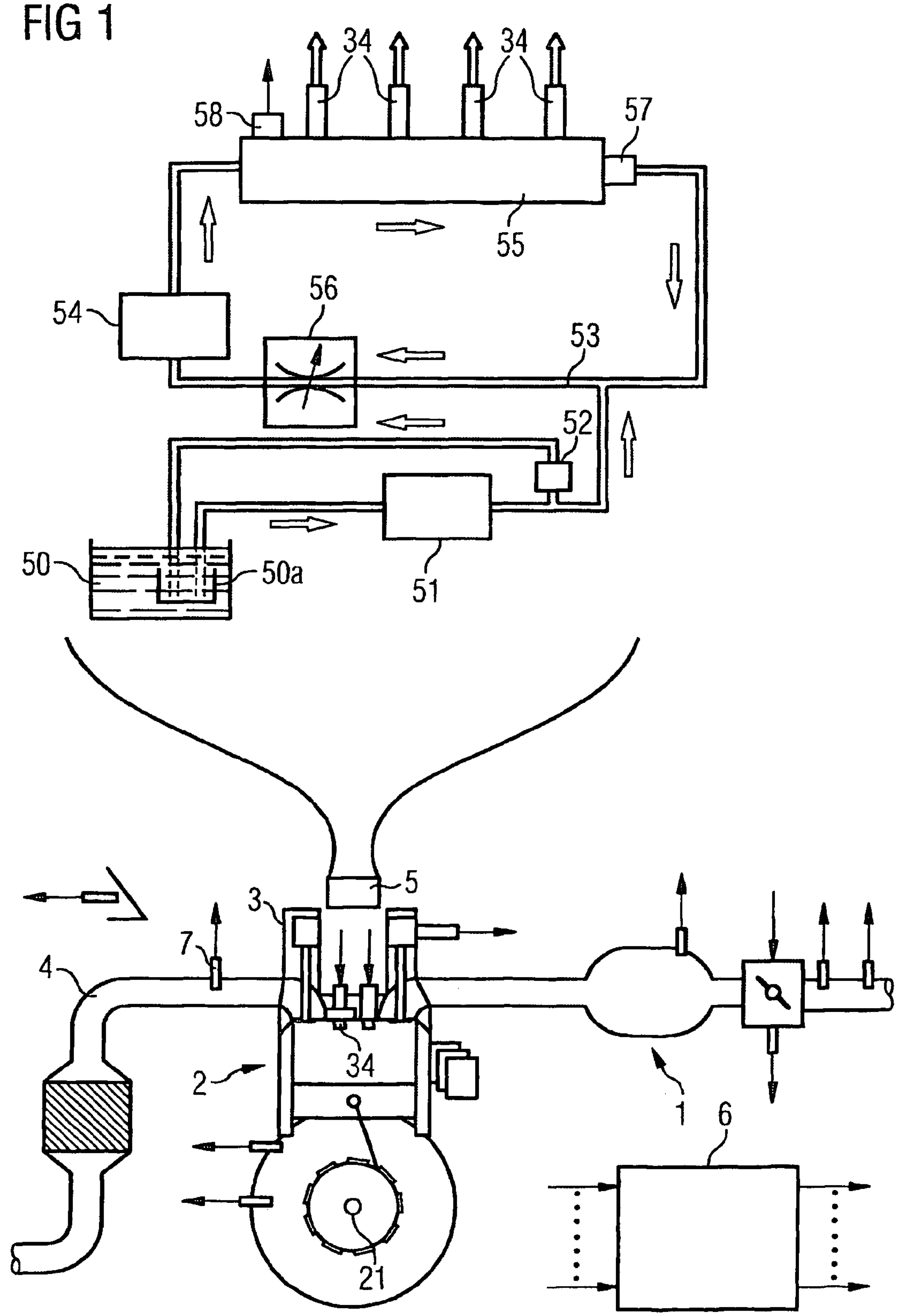
FIG. 1 an internal combustion engine with a fuel supplying device.

An internal combustion engine (FIG. 1) includes an intake tract 1, an engine block 2, a cylinder head 3 and an exhaust gas tract 4. The engine block 2 comprises a number of cylinders, which have pistons and connecting rods by means of which they are connected to a crankshaft 21.

The cylinder head 3 comprises a drive with a gas intake valve, a gas exhaust valve and valve gears. Furthermore, the cylinder head 3 also comprises both an injection valve 34 and a spark plug.

In addition, a supply device 5 for fuel is provided. It comprises a fuel tank 50, which is connected to a low-pressure pump 51 via a first fuel line. The fuel line opens into a fuel baffle 50*a*. On the outlet side, said low-pressure pump 51 has an operative connection to an intake 53 of a high-pressure pump 54. In addition, on the outlet side of the low-pressure pump 51, provision is also made for a mechanical regulator 52, which is connected to the fuel tank 50 via an additional fuel line. The low-pressure pump 51, the mechanical regulator 52, the fuel line, the additional fuel line and the intake 53 form a low-pressure circuit.

The low-pressure pump 51 is preferably embodied in such a way that while the internal combustion engine is operating, it always supplies a sufficient amount of fuel, which guarantees that a predetermined low-pressure value does not drop below the required minimum.

The intake 53 is routed through to the high-pressure pump 54, which on the outlet side transports fuel to a fuel accumulator 55. The high-pressure pump 54 is usually driven by the camshaft and thus transports a constant volume of fuel at a constant speed of the crankshaft 21.

The injection valves 34 have an operational connection to the fuel accumulator 55. In this way, the fuel is supplied to the injection valves 34 via a fuel accumulator 55.

In the feed line of the high-pressure pump 54, this means upstream of the high-pressure pump 54, provision is made for a control valve regulating a volumetric flow 56 by means of which the volumetric flow, which is supplied to the high-pressure pump 54, can be set. By controlling the control valve regulating a volumetric flow 56 in a corresponding manner, a predetermined fuel pressure FUP_SP can be set in the fuel accumulator 55.

The control valve regulating a volumetric flow 56 is an actuator, which controls a fuel feed flow of the high-pressure pump 54. The control valve regulating a volumetric flow 56 for example controls the fuel feed flow in accordance with the pulse width of a pulse-width modulated electrical current. The control valve regulating a volumetric flow 56 is embodied in such a way that the quantity of fuel transported by the high-pressure pump 54 increases with the pulse width.

In addition, the fuel supplying device 5 can also be provided with an electromagnetic pressure regulator 57 on the outlet side of the fuel accumulator 55 and with a return line in the low-pressure circuit. If a fuel pressure in the fuel accumulator 55 exceeds the fuel pressure FUP_SP predetermined by controlling the electromechanical pressure regulator 57 in a corresponding manner, the electromechanical pressure regulator 57 opens and fuel will be released from the fuel accumulator 55 into the low-pressure circuit.

As an alternative, the control valve for a volumetric flow 56 can also be integrated into the high-pressure pump 54 or a common actuator is allocated to the electromechanical pressure regulator 57 and the control valve for a volumetric flow 56. Moreover, it is also possible that there is no electromechanical pressure regulator 57 in the fuel supplying device 5. The predetermined fuel pressure FUP_SP is set by means of the control valve for a volumetric flow 56.

In addition, a control device 6 is provided to which sensors have been allocated, said sensors detecting the different measured quantities and in each case determining the measured value of the measured quantity. The control device 6 determines, in accordance with at least one of the measured quantities, the correcting variables, which are then converted into corresponding actuating signals for controlling the final control elements by means of corresponding actuators.

The sensors are a pedal position indicator which detects the position of an accelerator pedal, a crankshaft angle sensor which detects a crankshaft angle and to which a rotational speed is then allocated, a mass air flow meter, a fuel pressure sensor 58 which detects the fuel pressure FUP_AV in the fuel accumulator 55, and a lambda sensor 7 which detects a lambda value in the exhaust gas tract 4 which is characteristic of the air-to-fuel ratio in the cylinders of the internal combustion engine for the stoichiometric air-to-fuel ratio. Depending on the embodiment of the invention, any subset of the sensors or even additional sensors can be made available in each case.

The final control elements are for example embodied as gas intake valves or gas exhaust valves, injection valves 34, a spark plug, a throttle valve, a low-pressure pump 51, a control valve for a volumetric flow 56 or even as an electromechanical pressure regulator 57.

The internal combustion engine preferably also has additional cylinders to which corresponding final control elements are then allocated.

Figure 2:
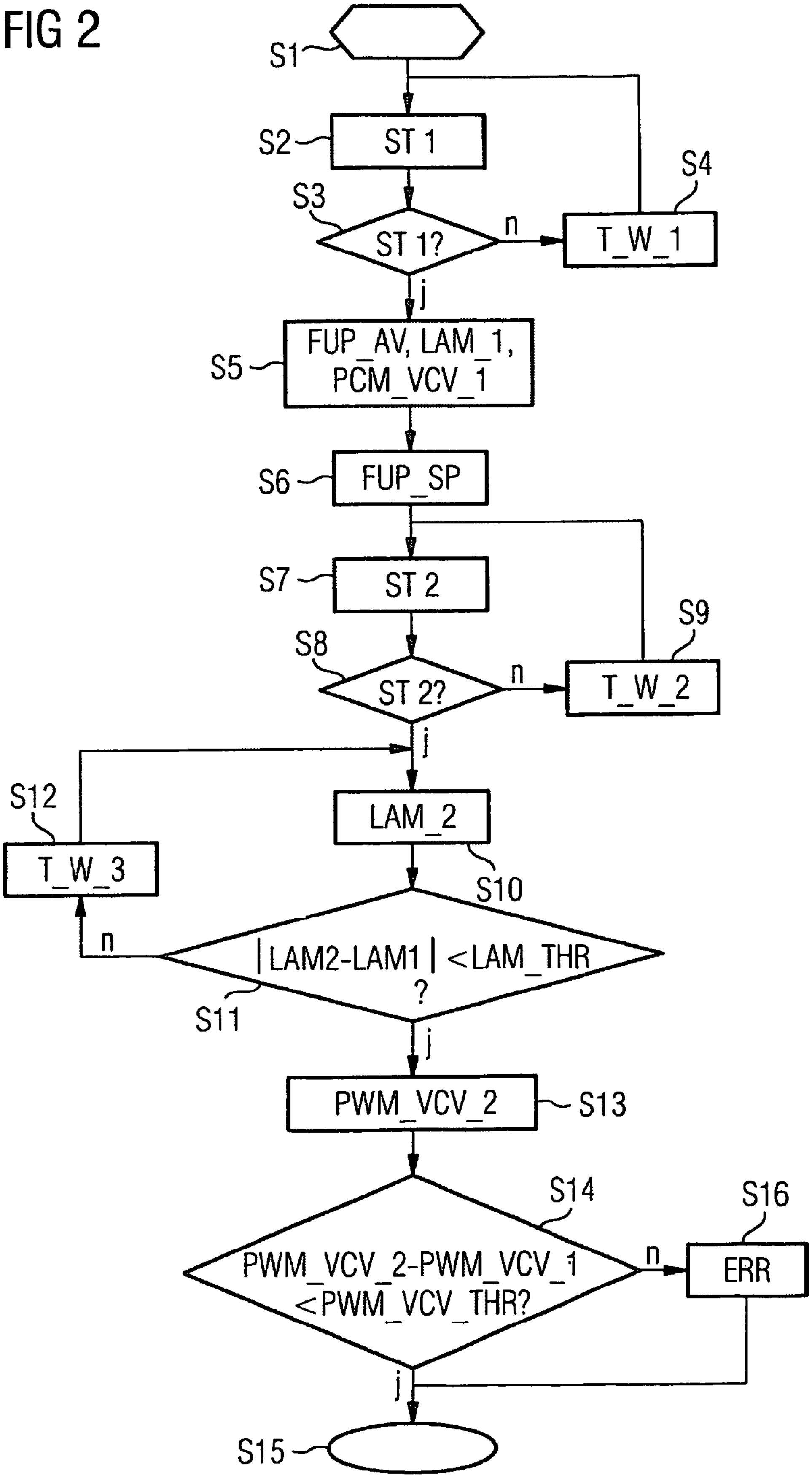
FIG. 2 a flow chart of a program for detecting errors in the fuel supplying device.

FIG. 2 shows a flowchart of a program for monitoring the fuel supplying device 5, which is stored in the control unit 6 and is processed during the operation of the internal combustion engine. A step S1 is for example carried out on starting the internal combustion engine. In a step S2, a first stationary-state value ST1 is determined which is illustrated with a logical value, if there is a stationary load.

In a step S3, a test is carried out to determine whether or not the first stationary-state value ST1 has the logical value. The fuel supplying device 5 is preferably monitored while the internal combustion engine idles, because while the said engine idles there is mostly a small and stationary load.

The stationary state of the load for example means that during a period of time, which has to be selected in a suitable manner and for example expires after a few seconds, the load lies within a predetermined, mostly narrow value range, i.e. it is essentially constant. Preferably, in step S3 a test is also carried out to determine whether or not the detected fuel pressure FUP_AV is stationary.

If the condition of step S3 has not been met, then in a step S4 the program sequence is interrupted for a first waiting period T_W_1 before the processing is then continued again in a step S2.

However, if the condition in step S3 has been met, then the actual fuel pressure FUP_AV and a first lambda value LAM_1 are detected in a step S5 and a first actuating signal PWM_VCV_1 of the control valve for a volumetric flow 56 determined.

In a step S6, the predetermined fuel pressure FUP_SP is increased and set by a predetermined amount or a predetermined factor compared to the recorded fuel pressure FUP_AV. A fuel pressure regulator provided in the control unit 6 regulates the fuel pressure in the fuel accumulator 55 at the predetermined fuel pressure FUP_SP.

In a step S7 a second stationary-state value ST2 is determined, which is characteristic of the stationary state of the recorded fuel pressure FUP_AV and, if required, of the stationary-state of additional operating variables such as for example the lambda value. In the event of a stationary state, the second stationary-state value ST2 is occupied with a logical value. In a step S8, the second stationary value ST2 is checked to determine whether or not there is a stationary state. If there is no stationary state, then the processing is continued again in a step S7 after the expiry of a second waiting period T_W_2 in a step S9. In the event of there being a stationary state in a step S8, the processing is continued in a step S10 in the case of which a second lambda value LAM_2 is recorded. In a step S11, a check is carried out in order to determine whether or not the difference between the second lambda value LAM_2 and the first lambda value LAM_1 is smaller than a predetermined threshold value LAM_THR of the lambda value. If this condition has not been met, then the program remains in a step S12 for a third waiting period T_W_3 before the processing is continued again in a step S10. However, if the condition in a step S11 has been met, then in a step S13, a second actuating signal PWM_VCV_2 of the control valve for a volumetric flow 56 is determined.

The predetermined threshold value LAM_THR of the lambda value has been selected so small that the first and the second lambda value LAM_1, LAM_2 can in essence be regarded as the same.

In a step S14, a check is carried out in order to determine whether or not the difference between the second actuating signal PWM_VCV_2 and the first actuating signal PWM_VCV_1 of the control valve for a volumetric flow 56 is smaller than a predetermined threshold value PWM_VCV_THR of the actuating signal. If this condition has been met, then no leakage is detected and the processing ends in a step S15 or, on the other hand, is continued again in a step S1 after the expiry of an additional waiting period, if required.

However, if the condition in a step S14 has not been met then a leakage is detected in the fuel supplying device 5 and an error ERR is registered and stored in a step S16, which can be requested in the case of maintenance work carried out at a later stage, if required. If the detected leakage is particularly large, an emergency run of the internal combustion engine has to be ensured, if required, and/or the necessary repair work must be pointed out to the driver of the motor vehicle. The processing ends in a step S15 or is continued in a step S1.

Because the quantity of fuel transported by the high-pressure pump 54 increases with the pulse width of the pulse-width modulated electrical current, in the case of the presence of a leakage this results in the second actuating signal PWM_VCV_2 of the control valve for a volumetric flow 56 being greater than the first actuating signal PWM_VCV_1 of the control valve for a volumetric flow 56, if the predetermined fuel pressure FUP_SP was increased in a step S6. If the second actuating signal PWM_VCV_2 of the control valve for a volumetric flow 56 is at least larger by a predetermined amount or a predetermined factor than a threshold value PWM_VCV_THR of the actuating signal, then the error ERR is detected.

Likewise, the leakage can be detected if the predetermined fuel pressure FUP_SP was reduced in a step S6 and the second actuating signal PWM_VCV_2 of the control valve for a volumetric flow 56 is at least smaller by a predetermined amount or a predetermined factor than the first actuating signal PWM_VCV_1 of the control valve for a volumetric flow 56.

In addition, the control valve for a volumetric flow 56 can be embodied in such a way that the fuel feed flow of the high-pressure pump 54 drops for increasing pulse widths of the pulse-width modulated actuating signal. If a leakage is present, after the predetermined fuel pressure FUP_SP has been increased, the second actuating signal PWM_VCV_2 of the control valve for a volumetric flow 56 is at least smaller by a predetermined amount or a predetermined factor than the first actuating signal PWM_VCV_1 of the control valve for a volumetric flow 56 in a corresponding manner or after the predetermined fuel pressure FUP_SP has been decreased, the second actuating signal PWM_VCV_2 of the control valve for a volumetric flow 56 is at least larger by a predetermined amount or a predetermined factor than the first actuating signal PWM_VCV_1 of the control valve for a volumetric flow 56 in a corresponding manner.

As an alternative to the control valve for a volumetric flow 56 and the high-pressure pump 54, it is also for example possible to make provision for a high-pressure pump 54, whose fuel feed flow is in accordance with a control angle. The control angle corresponds to the crankshaft angle, in which the high-pressure pump 54, at each crankshaft revolution, begins feeding fuel into the fuel accumulator 55. The feeding of fuel ends in each case once the crankshaft angle has reached a predetermined crankshaft angle. The first and the second actuating signals PWM_VCV_1, PWM_VCV_2 of the control valve for a volumetric flow 56 in this embodiment correspond to control angles. The above-mentioned explanation of the first and the second actuating signals PWM_

VCV_1, PWM_VCV_2 of the control valve for a volumetric flow 56 applies accordingly. The condition for the detection of said leakage in a step S14 must be adapted in a corresponding manner in all cases.

In order to be able to detect leakages in the fuel supplying device 5 in an accurate and reliable way, it is ensured that the injected quantity of fuel is in essence the same before and after the change in the predetermined fuel pressure FUP_SP in a step S6. The more accurately the injected quantities of fuel correspond before and after the change in the predetermined fuel pressure FUP_SP, the more accurately the leakage can be detected. In this way, it is easily possible to allocate the deviation of the second actuating signal PWM_VCV_2 of the control valve for a volumetric flow 56 from the first actuating signal PWM_VCV_1 of the control valve for a volumetric flow 56 to the leakage.

The injected quantity of fuel can for example be checked by means of the first and the second lambda values LAM_1, LAM_2. At a stationary load, the rotational speed of the internal combustion engine and the supplied volume of air are stationary. In the same way, if the injected quantity of fuel is stationary, then the lambda value is also stationary. However, if the second lambda value LAM_2, after the change in the fuel pressure, deviates from the first lambda value LAM_1, the air-to-fuel ratio is changed, which in the case of a supplied volume of air, which is the same, can be ascribed to a changed injected quantity of fuel. The control unit 6 mostly comprises a lambda regulation, which sets the injected quantity of fuel and/or the supplied volume of air in such a way that the first and the second lambda values LAM_1, LAM_2 for example are equal to one. At a stationary load, in the case of which the supplied volume of air is stationary, it is easily possible to ensure in this manner that the injected quantity of fuel is set in such a way by the lambda regulation that the injected quantity of fuel, after the predetermined fuel pressure FUP_SP has been set, is essentially the same as that of the injected quantity of fuel before the change in the predetermined fuel pressure FUP_SP.

If the first and the second lambda values LAM_L, LAM_2 or the lambda regulation is used for ensuring the injected quantity of fuel, then it must be possible to determine the first and the second lambda values LAM_1, LAM_2 in a reliable manner. It is possible to determine the reliable first and second lambda values LAM_1, LAM_2 in accordance with the temperature of the internal combustion engine. Therefore, it is advantageous to check the fuel supplying device 5 beforehand for a leakage once the internal combustion engine has reached its operating temperature.

The threshold value PWM_VCV_THR of the actuating signal is preferably a predetermined value which is for example determined empirically or by means of simulation.

The invention claimed is:

1. A method for monitoring a fuel supplying device an internal combustion engine, comprising:
- providing a low-pressure fuel circuit that supplies a fuel supply;
- coupling an input side of a high-pressure pump to the low-pressure circuit;
- transporting fuel from the high pressure pump into a fuel accumulator; and
- controlling a fuel feed flow of the high-pressure pump by an actuator during a constant load where:
  - a first fuel pressure value and a first actuating signal of the actuator are determined,
  - a second fuel pressure value is set, the second fuel pressure value being different than the first fuel pressure value by a pre-determined amount,
  - a second actuating signal of the actuator is determined once the second value of the fuel pressure is set, and
  - an error in the fuel supplying device is detected based on the first and the second actuating signals of the actuator.

2. The method as claimed in claim 1, wherein the second fuel pressure value is greater than the first fuel pressure value by a pre-determined amount.

3. The method as claimed in claim 1, wherein the second fuel pressure value is less than the first fuel pressure value by a pre-determined amount.

4. The method as claimed in claim 1, wherein the second actuating signal of the actuator is determined if the fuel pressure in the fuel accumulator is constant.

5. The method as claimed in claim 1, wherein the second actuating signal of the actuator is determined if:
- a variable that characterizes the air-to-fuel ratio in the cylinder is stationary and
- a value of the first fuel pressure value is the same as the value of the second fuel pressure value.

6. The method as claimed in claim 1, wherein the error in the fuel supplying device is detected if the second actuating signal of the actuator deviates from the first actuating signal of the actuator by at least a predetermined amount.

7. The method as claimed in claim 1, wherein the first and the second actuating signal of the actuator is determined if the internal combustion engine is operated at a small load.

8. The method as claimed in claim 1, wherein the first and the second actuating signals of the actuator are determined if the internal combustion engine is operated at engine idle.

9. An internal combustion engine fuel supply monitoring device, comprising:
- a low-pressure fuel circuit;
- a high-pressure fuel pump connected to the low-pressure fuel circuit on an input side of the high pressure pump and transports fuel into a fuel accumulator; and
- an actuator that controls a fuel feed flow of the high-pressure pump wherein at a constant load:
  - a first value of a fuel pressure and a first actuating signal of the actuator are determined,
  - a second value of the fuel pressure is set, the second value being larger or smaller than the first value of the fuel pressure by a pre-determined amount,
  - a second actuating signal of the actuator is determined once the second value of the fuel pressure has been set, and
  - an error in the fuel supplying device is detected in accordance with the first and the second actuating signal of the actuator.

10. The device as claimed in claim 9, wherein the second actuating signal of the actuator is determined if the fuel pressure in the fuel accumulator is constant.

11. The device as claimed in claim 9, wherein the second actuating signal of the actuator is determined if:
- a variable that characterizes the air-to-fuel ratio in the cylinder is stationary and
- a value of the first fuel pressure value is the same as the value of the second fuel pressure value.

12. The device as claimed in claim 9, wherein the error in the fuel supplying device is detected if the second actuating signal of the actuator deviates from the first actuating signal of the actuator by at least a predetermined amount or a predetermined factor.

13. The device as claimed in claim 9, wherein the first and the second actuating signal of the actuator is determined if the internal combustion engine is operated at a small load.

14. The device as claimed in claim 9, wherein the first and the second actuating signals of the actuator are determined if the internal combustion engine is operated at engine idle.

15. An internal combustion engine system, comprising:

an engine block having a plurality of cylinders defined within the block;

a crank shaft arranged in the engine block below the cylinders;

a plurality of pistons arranged in the cylinders and connected to the crank shaft;

a cylinder head arranged on the engine block opposite the crank shaft and forming a combustion chamber;

a plurality of inlet valves arranged in the cylinder head that regulate the inlet of an inlet flow into the combustion chamber;

a plurality of exhaust valves arranged in the cylinder head that regulate the outlet of an exhaust flow out of the combustion chamber;

an intake duct connected to the cylinder head to provide an inlet flow to the cylinders;

a low-pressure fuel circuit;

a high-pressure fuel pump connected to the low-pressure fuel circuit on an input side of the high pressure pump and transports fuel into a fuel accumulator; and an actuator that controls a fuel feed flow of the high-pressure pump wherein at a constant load:

a first value of a fuel pressure and a first actuating signal of the actuator are determined, a second value of the fuel pressure is set that is different than the first value of the fuel pressure by a pre-determined amount, a second actuating signal of the actuator is determined once the second value of the fuel pressure has been set, and an error in the fuel supplying device is detected in accordance with the first and the second actuating signal of the actuator.

16. The system as claimed in claim 15, wherein the second fuel pressure value is greater than the first fuel pressure value by a pre-determined amount.

17. The system as claimed in claim 15, wherein the second fuel pressure value is less than the first fuel pressure value by a pre-determined amount.

* * * * *

UNITED STATES PATENT AND TRADEMARK OFFICE

CERTIFICATE OF CORRECTION

PATENT NO. : 7,493,804 B2

APPLICATION NO. : 11/628900

DATED : February 24, 2009

INVENTOR(S) : Erwin Achleitner et al.

It is certified that error appears in the above-identified patent and that said Letters Patent is hereby corrected as shown below:

Title Page
Please insert the following Foreign Application Priority Data on the face of the patent at line (30):

--June 11, 2004 (DE) 10 2004 028 515.2--

Signed and Sealed this

Thirtieth Day of June, 2009

JOHN DOLL

*Acting Director of the United States Patent and Trademark Office*